Figures 1, 2:
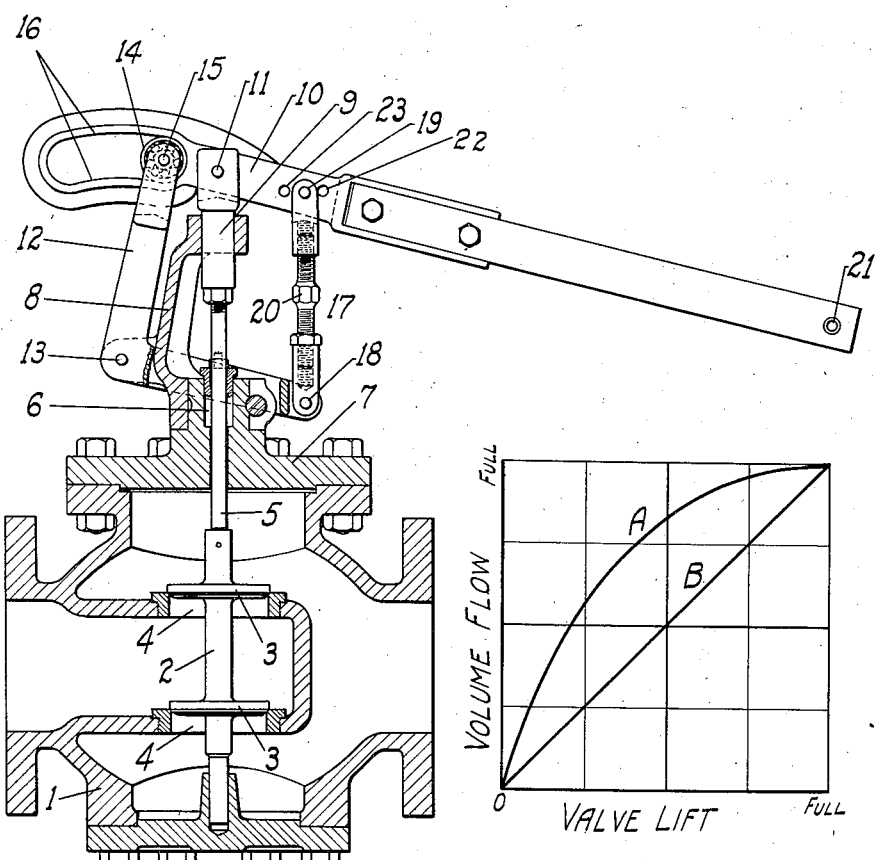

March 24, 1936.  J. L. KIMBALL  2,035,166
THROTTLE VALVE
Filed March 16, 1935

James L Kimball  INVENTOR.

Patented Mar. 24, 1936

2,035,166

UNITED STATES PATENT OFFICE 2,035,166

THROTTLE VALVE

James Lewis Kimball, Danvers, Mass., assignor to Ruggles-Klingemann Mfg. Company, Salem, Mass.

Application March 16, 1935, Serial No. 11,423

7 Claims. (Cl. 137—139)

My invention relates to improvements in throttle valves, being particularly adapted to the lever type of throttle valve, commonly used in conjunction with pressure, temperature and water level regulators in which a definite variation in the physical condition to be controlled, will cause a corresponding incremental movement of the valve lever.

Lever throttle valves generally used for this purpose are what is known as double poppet type, as shown in the accompanying drawing, in which the operation of the moving part of the valve is substantially balanced to pressure within the valve casing. But regardless of the type of valve used, it is generally understood that the volume flow is not of a uniform amount for uniform degrees of lift or opening. While a valve of the flat disc type must be lifted one fourth of the diameter of the disc, in order that the area of lift will equal the area of orifice, yet approximately seven eighths of the flow will take place on a lift of only one half of this amount.

It is therefore one of the objects of this invention, to so vary the movement of the valve in relation to the movement of the regulator, that for equal movement of the regulator, equal volume will be passed through the valve. This is accomplished by so arranging the valve that the first opening movement will be comparatively slow in relation to the final opening movement. To accomplish this result, I automatically adjust the valve lever fulcrum with the same movement of the lever which opens and closes the valve, moving the fulcrum position of the lever nearer to the valve stem as the valve is closed and farther away from the stem as the valve is opened.

Another object of the invention is in providing manual adjustable means for varying the position of the lever fulcrum in relation to the valve stem to cause a greater or less maximum lift of the valve with a definite maximum stroke of the regulator, or that of the long arm of the lever, without changing the position of the lever when the valve is closed.

Various methods have been devised to compensate for this variable flow characteristic of valves: one is to skirt the poppet and to form V notches in the skirt: another is to make that part of the valve disc entering the orifice parabolic in shape. Both of these methods require a high valve lift which is not always desirable and furthermore the construction is more expensive.

My invention will best be understood by reference to the accompanying drawing, in which Fig. 1 shows a vertical section of a common type of balanced pressure valve, and the parts associated therewith, for carrying out a preferred embodiment of my invention. Fig. 2 illustrates volume flow curves, showing the flow characteristic of an ordinary type of balanced valve, and also the flow curve of the same type of valve, having the straight line flow characteristic due to the application of my invention.

Referring to Fig. 1 a valve casing 1 has valve poppet 2 constructed with valve discs 3—3 adapted to throttle the flow of steam or other fluid passing through the ports 4—4, such a valve arrangement being of well known construction and extensively used in reducing steam pressure and other control operations, a valve stem 5 is connected with valve poppet 2 and extends through a stuffing box 6 in valve casing cover 7, a yoke 8 is secured to valve cover 7 and adapted to receive at its upper end a plunger 9 one end of which is connected to the valve stem 5 and the other end pivoted to a valve operating lever 10 at point 11, a bell crank 12 is pivoted on the valve yoke 8 at point 13, one arm of said bell crank extends upward and is forked at its upper end and arranged to receive a roller bearing 14 pivoted to said arm at 15, said roller bearing acting as a fulcrum for lever 10 and adapted to operate in a radial slot in the end of said lever 10, the outer surface 16—16 of which is formed on a radius struck from pivot point 13, when valve 2 is in a closed position. The other arm of the bell crank extends substantially parallel with the valve lever 10 to the opposite side of the valve stem 5 and being provided with a connecting link 17 pivoted on the bell crank at 18, and another pivoted connection at the upper end of the link at point 19, on the valve lever 10. This connecting link is made adjustable longitudinally by means of a right and left threaded stud 20, whereby the position of the roller bearing fulcrum point can be manually adjusted toward or away from the valve stem 5, when the valve is in the closed position shown, without changing the position of the valve lever 10. The purpose of this adjustment is obviously to lengthen or shorten the fulcrum position in relation to the valve stem, in order to vary the total lift of the valve 2, with a given amount of movement of the lever at position 21, the radial slot at the opposite end of the lever being such as to accommodate for a limited manual adjustment in addition to the automatic adjustment of the fulcrum in the opening and closing movement of the valve, which will now be explained.

As set forth under the objects of the invention, the purpose of this automatic adjustable fulcrum is to vary the degree of valve lift to compensate for a variable flow characteristic of the valve, and to effect equal volume variations for equal movements of the lever at point 21, assuming that a regulator is connected to the end of this valve lever at point 21 such as shown in my prior Patent #1,597,203 of August 24, 1926, and that this regulator had uniform steps of travel for uniform variations in pressure, and that it was desirable to pass through the valve uniform variations in volume flow, corresponding to the uniform step action of the regulator.

Now to accomplish this object it becomes necessary to vary the lift of the valve in relation to the steps of operation, of the regulator. In my invention this is accomplished by automatically adjusting the fulcrum of the valve, as the regulator opens the valve, the movement of the connecting link pivoted at point 19 to the valve lever, rocks the bell crank 12 on its pivot point 13, to move the roller bearing fulcrum into a longer arm position and therefore increase the opening movement of the valve, in relation to the movement imparted to the lever at point 21, likewise on the closing movement of the valve the poppet 2 is slowed down in relation to the movement at 21 as the fulcrum is automatically adjusted into its shorter arm position.

In my invention I provide additional points of connection for the connecting link 17 on lever 10. These points as designated 22 and 23 are struck on a radius from point 18. By means of this adjustment the degree of the automatic adjustment of the fulcrum in the opening and closing movement of the valve can be varied. It will now be understood that by means of the various adjustments as outlined in the specifications, I have devised a self adjusting fulcrum which will compensate for variable flow characteristics through the valve.

Fig. 2 shows a curve designated as A which is about what might be expected in flow characteristic from a value of this type shown, but without my self adjusting fulcrum. Curve B shows a straight line flow characteristic, and this, or any variations from the straight line flow characteristic is possible by means of my invention. As pointed out in the statement of invention, there are other ways in which this object can be accomplished, but such methods are of more or less of a hit or miss proposition and do not permit any adjustment to correct inaccuracy of design or variations in flow characteristics, which may be due to a change in the operating conditions or cutting action, causing the wearing away of the flow controlling valve, which might change its flow characteristic.

I desire to have it understood that the arrangement as herein disclosed is only illustrative and is capable of various modifications, and that only such limitations shall be imposed as are indicated in the appended claims.

I claim:—

1. The combination of a valve and means to open and close said valve comprising a valve stem, a lever operatively connected to the valve stem, a fulcrum for said lever, means to adjust the position of said fulcrum comprising a bell crank, having a fixed pivoted connection on the valve casing, one arm of said bell crank being slidably connected to said lever at one side of said valve stem, and the other arm of said bell crank extending substantially parallel with said lever to the opposite side of said stem, and a link operatively connecting the last named arm with said lever.

2. The combination of a valve and means to open and close said valve comprising a valve stem, a lever operatively connected with the valve stem, a bell crank, having a stationary pivotal connection on the valve casing, one arm of said bell crank being slidably connected to one end of said lever and radially adjustable toward and away from said valve stem on said pivotal connection, the other arm of said bell crank extending substantially parallel with said lever to the opposite side of said valve stem, a link operatively connecting last named arm with said lever, the arrangement constituting an adjustable fulcrum movable toward and away from said valve stem by the opening and closing movement of said valve.

3. The combination of a valve and means for opening and closing said valve, comprising a valve stem, a lever operatively connected with the valve stem, a fulcrum for said lever, means operated by the closing and opening movement of said valve to move said fulcrum toward and away from said valve stem and means to manually adjust the position of said fulcrum in relation to said valve stem.

4. The combination of a valve and means to open and close said valve comprising a valve stem, a lever operatively connected with the valve stem, a fulcrum for said lever, said fulcrum being slidably adjustable on one end of said lever, means operated from another position on said lever for adjusting said fulcrum toward and away from said valve stem by the opening and closing movement of said valve and means for manually adjusting the position of said fulcrum in relation to said valve stem.

5. The combination of a valve and means for opening and closing said valve comprising a valve stem, a lever operatively connected with the valve stem, a fulcrum for said lever, means operated by the closing and opening movement of said valve to move said fulcrum toward and away from said valve stem, and means to manually adjust the position of said fulcrum in relation to said valve stem, when said valve is closed without changing the position of said lever.

6. The combination of a valve and means to open and close said valve comprising a valve stem, a lever operatively connected with the valve stem, a bell crank having a stationary pivotal connection on the valve casing, one arm of said bell crank being slidably connected to one end of said lever and radially adjustable on said lever toward and away from said valve stem, the other arm of said bell crank extending substantially parallel with said lever to the opposite side of said valve stem, a link operatively connecting the last named arm with said lever, and means to longitudinally adjust said link when said valve is closed to move the first named arm toward and away from said valve stem without changing the position of said lever.

7. The combination of a valve and means for opening and closing said valve comprising a valve stem, a lever operatively connected with the valve stem, a fulcrum link, one end of which is pivotally connected on the valve casing and the other end adapted to support one end of said lever, said fulcrum link being slidably connected with said lever and movable toward and from said stem through a predetermined angular movement on an arc adapted not to change the position of said lever when said valve is in a closed position, and means to adjust the position of said fulcrum link in relation to said valve stem.

JAMES L. KIMBALL.